(12) United States Patent
Everritt et al.

(10) Patent No.: US 9,757,813 B2
(45) Date of Patent: Sep. 12, 2017

(54) WELDING PRESSURE CONTROL APPARATUS AND METHOD

(71) Applicants: Steven Mark Everritt, Houston, TX (US); Carl Cooper, Houston, TX (US); Art Parmely, Houston, TX (US); Richard Grifno, Houston, TX (US)

(72) Inventors: Steven Mark Everritt, Houston, TX (US); Carl Cooper, Houston, TX (US); Art Parmely, Houston, TX (US); Richard Grifno, Houston, TX (US)

(73) Assignee: Delta Screen & Filtration, LLC, Houston, TX (US)

( * ) Notice: Subject to any disclaimer, the term of this patent is extended or adjusted under 35 U.S.C. 154(b) by 302 days.

(21) Appl. No.: 14/510,247

(22) Filed: Oct. 9, 2014

(65) Prior Publication Data

US 2015/0102014 A1 Apr. 16, 2015

Related U.S. Application Data

(60) Provisional application No. 61/889,185, filed on Oct. 10, 2013.

(51) Int. Cl.
*B23K 11/06* (2006.01)
*B23K 11/25* (2006.01)
*B23K 11/00* (2006.01)

(52) U.S. Cl.
CPC .......... *B23K 11/255* (2013.01); *B23K 11/008* (2013.01); *B23K 11/06* (2013.01)

(58) Field of Classification Search
CPC ....... B23K 11/00; B23K 11/008; B23K 11/25; B23K 11/255

USPC ........... 219/81, 82, 83, 78.01, 78.02, 86.22, 219/86.23, 86.24, 86.25
See application file for complete search history.

(56) References Cited

U.S. PATENT DOCUMENTS

| 2,185,999 A | 1/1940 | Johnson |
| 3,939,879 A * | 2/1976 | Tolliver ................. B21F 33/00 140/107 |
| 4,079,614 A | 3/1978 | Hall et al. |
| 4,314,129 A * | 2/1982 | Wilson .................. B01D 29/111 140/112 |

(Continued)

FOREIGN PATENT DOCUMENTS

GB 1239459 A1 7/1971

OTHER PUBLICATIONS

International Search Report, dated Jan. 9, 2015.
ISA Written Opinion, dated Jan. 9, 2015.

*Primary Examiner* — Quang D Thanh
*Assistant Examiner* — Ayub Maye
(74) *Attorney, Agent, or Firm* — Keeling Law, LLC; Kenneth A. Keeling; Mark S. Solomon

(57) ABSTRACT

An apparatus for manufacturing wire wrapped screens utilizing a wire and support ribs is provided. The apparatus employs welding pressure control, utilizing a welding device mounted on a support assembly, wherein the support assembly is moveable in relation to a mounting structure and the wire and support rib weld pieces. Welding pressure is determined by a force measurement device, and a control and feedback system adjusts pressure. Mechanical actuator cylinders mounted on the support assembly and the mounting structure provide load balance. A method for making wire wrapped screens is also provided.

20 Claims, 4 Drawing Sheets

(56) References Cited

U.S. PATENT DOCUMENTS

| | | | |
|---|---|---|---|
| 5,676,862 A | 10/1997 | Matteson | |
| 6,089,493 A * | 7/2000 | Moore | B21C 47/003 242/418.1 |
| 7,281,319 B1 | 10/2007 | Allford | |
| 7,806,178 B2 * | 10/2010 | Dyson | B21F 27/124 166/227 |
| 2006/0266794 A1 * | 11/2006 | Melfi | B21C 47/146 228/56.3 |
| 2010/0301795 A1 | 12/2010 | Sato et al. | |

\* cited by examiner

WELDING PRESSURE CONTROL APPARATUS AND METHOD

CROSS-REFERENCE TO RELATED APPLICATIONS

This application claims the benefit of U.S. Provisional Application No. 61/889,185 filed on Oct. 10, 2013, which application is incorporated herein by reference as if reproduced in full below.

STATEMENT REGARDING FEDERALLY SPONSORED RESEARCH OR DEVELOPMENT

Not Applicable.

FIELD OF THE INVENTION

The present invention relates to wire wrapped screens used during the production of oil, gas, and liquids. More particularly, the present invention relates to apparatus and methods of manufacturing wire wrapped screens.

BACKGROUND

Hydrocarbons are produced by drilling into subterranean hydrocarbon-bearing formations. Producing unconsolidated formation walls can result in sand or silt accumulating in the wellbore, which can ultimately cause various problems in the drilling operation. For instance, accumulated sand and rock particles may plug the wellbore formation, resulting in reduced production. Over the years, many methods of preventing sand from entering the wellbore along with the hydrocarbons have been developed, including gravel packing and use of sand screens. Sand control has become increasingly important in the industry.

Gravel packing is a commonly used method to keep formation sand in place and out of the well stream. Gravel packing entails placing a perforated base pipe or a well screen into the wellbore and packing the surrounding annulus with gravel of a desired size. The gravel serves as an additional filter medium to keep sand and fine particulates out of the production stream and provides support to the surrounding formation walls to prevent collapse.

Well screens used in sand control applications can be of various types, including wire mesh and continuous slot wire wrapped. Continuous slot wire wrapped screens are composed of wire helically wrapped around multiple support ribs to form a cylindrical screen with a continuous helical slot. It is important that slot size is maintained within determined tolerances throughout the length of the screen.

Wire wrapped screens are typically manufactured using wire wrapping machines that simultaneously wrap and weld the wire around multiple support ribs to form a hollow cylindrical well screen of a desired length. A spindle rotates the ribs causing wire to be wrapped around the set of ribs.

An important aspect of the manufacturing process is consistent, uniform welds. The present invention provides an improved apparatus and method for maintaining consistent weld pressure during the welding process at faying surfaces of the wrap wire and the ribs.

BRIEF SUMMARY OF THE INVENTION

A welding pressure control apparatus and method for a wire wrapping system comprises a welding device mounted on a welding support assembly. The support assembly is moveable in relation to a mounting structure and the weld pieces. Mechanical actuator cylinders mounted on the support assembly and the mounting structure provide load balance. A force measurement device indicates support assembly force transmitted to the welding device. A control and feedback system utilizes the force information to adjust welding pressure. Other characteristics and advantages of the invention will be apparent from the following description, the accompanying drawings, and the appended claims.

BRIEF DESCRIPTION OF THE DRAWINGS

For a more complete understanding of the embodiments of the invention, reference is now made to the following Detailed Description of the Invention, taken in conjunction with the accompanying drawings, in which.

DETAILED DESCRIPTION OF THE INVENTION

Figure 1:
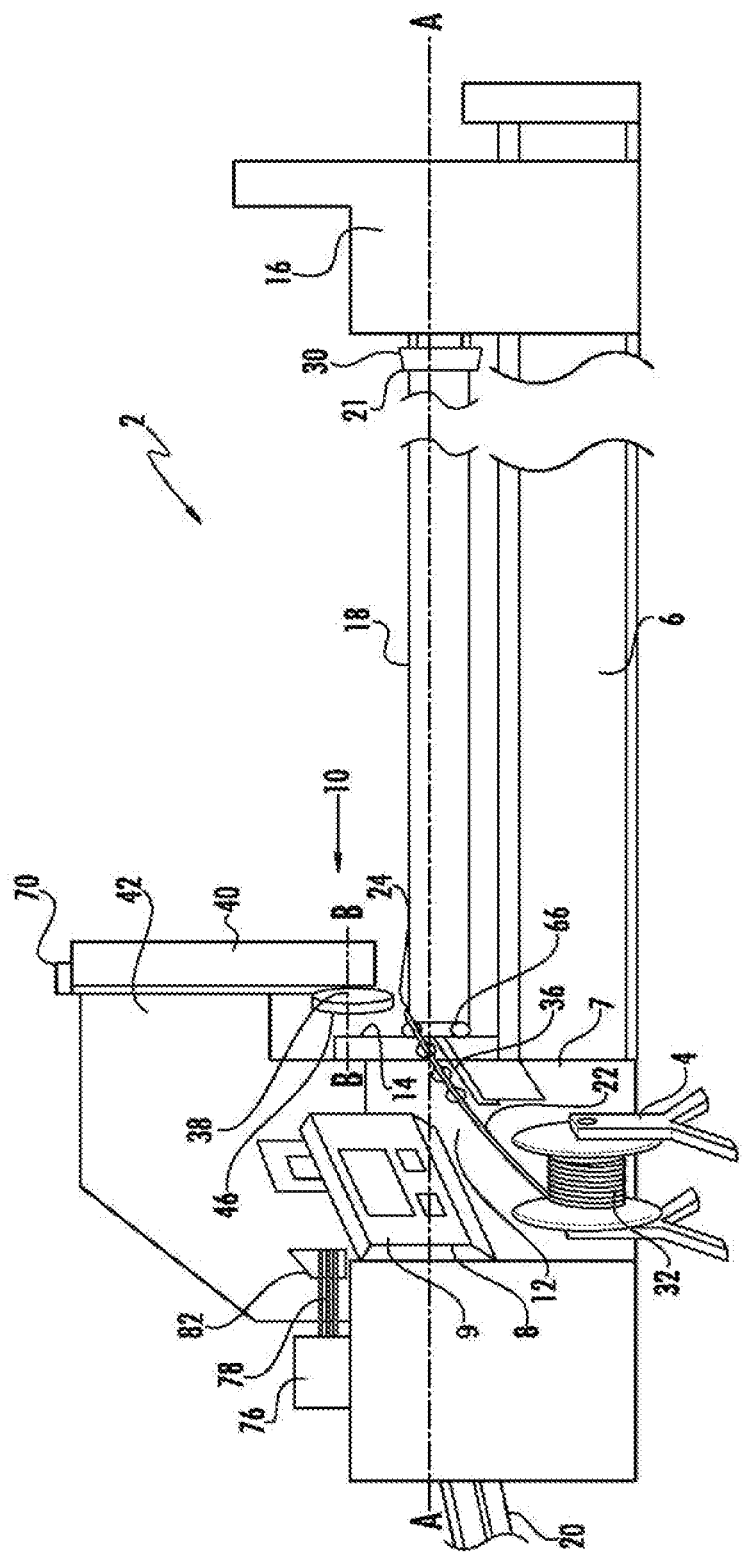
FIG. 1 is an illustrative view of a wire wrapping system with a pressure control assembly of the present invention.

Referring now to the drawings, wherein like reference characters designate like or similar parts throughout, FIG. 1 depicts a wire wrapping system 2 having a welding pressure control assembly 10. Wire wrapping system 2 is used to manufacture wire wrapped well screens 18. Wire wrapping system 2 includes a wire feed assembly 4, bed 6, control module 8, welding pressure assembly 10, headstock 12, rotating spindle 14, and tailstock 16.

A plurality of elongated support ribs 20 and wire 22 are used to form screen 18. Screen 18 may be formed around a pipe (not shown), or screen 18 may be formed as a generally hollow structure without a pipe being present during formation, as is depicted in FIG. 1. Wire 22 is wrapped helically around the support ribs 20 and is welded at each contact point 24 to a rib 20. In this context, welding includes fusion welding, such as, but not limited to, electrical resistance welding. In an exemplary embodiment, welding is performed by a rotating welding wheel electrode 46 provided proximate headstock 12. The welding wheel electrode 46 welds each wire 22 to corresponding ribs 20 at contact points 24 by electrical resistance welding.

Headstock 12 is equipped with a rotating spindle 14. Spindle 14 rotates about axis A-A. Spindle 14 has a plurality of radially spaced rib openings 26 (shown in FIG. 2) through which ribs 20 extend. Openings 26 are spaced from spindle axis A-A at various distances and in patterns to allow multiple circular patterns of openings 26. In an exemplary embodiment, spindle 14 contains multiple circular patterns of openings 26 to allow construction of various diameters of screen 18.

Openings 26 allow ribs 20 to extend generally along axis A-A but spaced therefrom prior to welding. Other supports (not shown) intermediate headstock 12 and tailstock 16 support ribs 20 substantially parallel to and equally spaced from axis A-A after welding, if a screen 18 is being formed without a pipe disposed there within.

Ribs 20 each have a first rib end 21 extending toward tailstock 16. A tailstock spindle 30 grasps proximate rib ends 21 with a grasping mechanism (not shown) such as a pull ring or a chuck. Tailstock spindle 30 rotates about axis A-A.

Spindle 14 and tailstock spindle 30 are each driven to rotate about axis A-A by a servo motor (not shown). The servo motors driving spindle 14 and spindle 30 are each electronically connected to a processor 9, which may be part of control panel 8. Rate of rotation may therefore be controlled by processor 9.

Head 66 is fixedly attached to spindle 14 and extends outward from the spindle 14 in the direction of the tailstock 16. As shown in FIG. 3A, head 66 has cylindrical openings (not shown) with milled longitudinal slots 15 sized and located to support ribs 20 and maintain rib 20 spacing. Head 66 serves as a support for ribs 20 and wire 22 during welding and comprises an electrode of the welding process. Head 66 may be of differing sizes for different screen 18 diameters. In one aspect wherein screen 18 is to be formed around a pipe, spindle 14 includes a centralized opening (not shown), in lieu of head 66, through which the pipe extends. Tailstock spindle 30 grasps the end of the pipe extending through spindle 14 with a grasping mechanism (not shown).

Headstock 12 is disposed proximate first bed end 7 of bed 6. Bed 6 is an elongate structure that extends along a longitudinal axis substantially parallel to, but offset from, axis A-A. Tailstock 16 is moveable along bed 6. Movement of tailstock 16 may be controlled by a conventional linear drive mechanism, such as a ball screw drive. In an exemplary embodiment of the present invention, tailstock 16 is moved and controlled by an induction linear guide. The driver (not shown) controlling movement of tailstock 16 is electronically connected to processor 9 to allow controlled movement of tailstock 16 along bed 6.

Wire feed assembly 4 is positioned proximate headstock 12. Wire feed assembly 4 includes a rotating wire feed spool 32 and wire guide 36. Wire guide 36 directs wire 22 toward support ribs 20.

Figure 2:
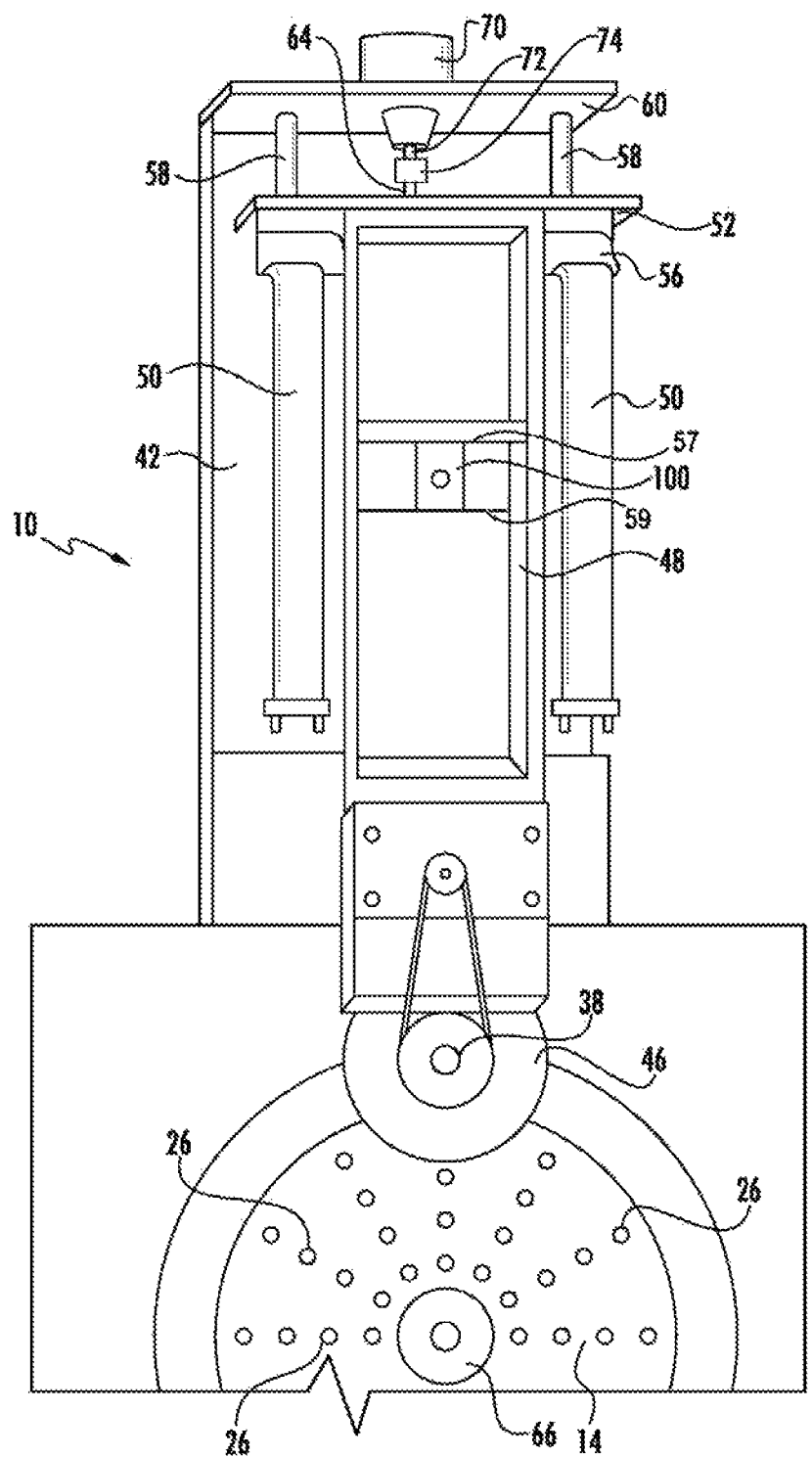
FIG. 2 is a partial view of a mounting structure of the present invention.
Figure 3:
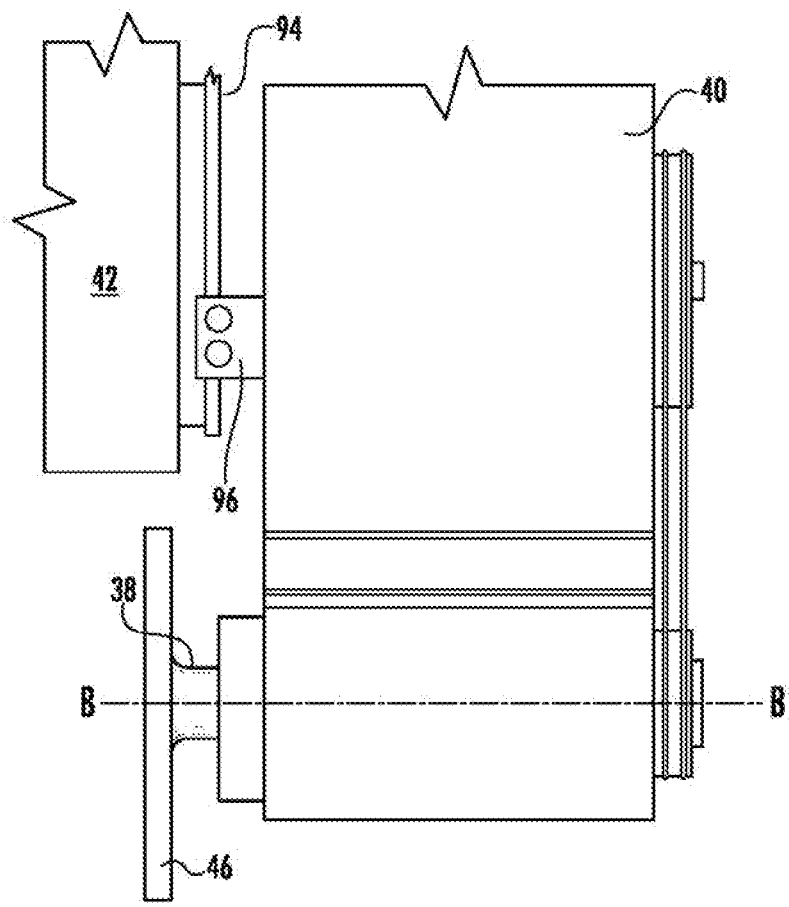
FIG. 3 is a partial side view of a welding support assembly and mounting structure of the present invention.
Figure 3A:
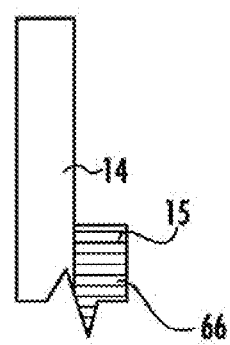
FIG. 3A is a partial side view of a rotating spindle of the present invention.

Referring to FIG. 2 and FIG. 3, welding assembly 10 is located proximate bed 6. Welding assembly 10 comprises a welding arm 38 positioned on welding support assembly 40 moveably positioned above bed 6. Support assembly 40 is supported by a mounting structure 42. Welding arm 38 is rotatable in relation to support assembly 40. A section of welding arm 38 extends through support assembly 40 and a section of welding arm 38 extends from support assembly 40 toward headstock 12. Welding wheel electrode 46 is mounted on welding arm 38 intermediate support assembly 40 and headstock 12. A welding wheel assembly (not separately labeled), which includes welding arm 38, is mounted to the bottom surface of support assembly 40 extending downwardly therefrom. The welding wheel assembly supports welding arm 38.

Mounting structure 42 is supported on headstock 12 and is laterally moveable parallel to axis A-A. In an exemplary embodiment as shown in FIG. 1, lateral movement of mounting structure 42 is controlled by a servo motor 76 mounted on headstock 12 driving a ball screw shaft 78. Guides 82, mounted to mounting structure 42, interact with ball screw shaft 78 resulting in controlled lateral movement of mounting structure 42 responsive to operation of servo motor 76. Servo motor 76 is electronically connected to processor 9 of control panel 8 to provide controlled operation of servo motor 76 and consequent lateral movement of mounting structure 42.

Welding wheel electrode 46 rotates on an axis of rotation depicted as B-B in FIG. 1 and FIG. 3. Axis B-B is parallel to, but offset from, axis A-A. In an exemplary embodiment of the present invention, welding wheel electrode 46 may be adjustably biased against wire 22 to adjust the weld force applied by the welding wheel electrode 46 to wire 22.

Welding support assembly 40 includes a vertical mounting frame 48 attached to a shelf 52. Cylinders 50, which in one aspect may be hydraulic and/or pneumatic, are attached to shelf 52 at mounting brackets 56. Cylinders 50 are placed on opposing sides of frame 48. A cylinder rod 58 extends from each cylinder 50 through shelf 52 to mounting bracket 60 of mounting structure 42. Cylinder rods 58 are attached to bracket 60. Cylinders 50 are each vertically oriented. Cylinders 50, cylinder rods 58, shelf 52, and bracket 60 are arranged to allow for controlled vertical movement of shelf 52, and accordingly, for controlled vertical movement of support assembly 40 in relation to mounting structure 42.

A motor 70 is provided on bracket 60 such that the motor shaft 72 extends vertically through bracket 60. A coupler 74 is mounted below bracket 60 and connects motor shaft 72 to lead screw 64. Lead screw 64 is a helically-threaded shaft of a ball screw type linear actuator system (comprising motor 70, shaft 72, coupler 74, and screw 64). A ball nut (not shown) is attached to support assembly 40. Motor 70, lead screw 64, and the ball nut cooperatively allow controlled vertical movement of support assembly 40 in relation to mounting structure 42 by operation of motor 70. Motor 70 is electronically connected to processor 9 of control panel 8 to allow controlled operation of motor 70 and thereby controlled vertical movement of support assembly 40 and of welding wheel electrode 46.

Referring to FIG. 3, a side view of a guide channel 94 and a guide bracket 96 is shown. Two guide channels 94 are fixedly attached to mounting structure 42. Each guide channel 94 is vertically oriented. Guide brackets 96 are attached to support assembly 40. Guide brackets 96 and guide channels 94 are sized and structured to allow vertical movement of support assembly 40 in relation mounting structure 42, but to limit horizontal movement of support assembly 40 in relation to mounting structure 42.

A force measurement device (such as a load cell) 100 is provided in the welding assembly 10 to determine forces, and therefore pressure applied by the welding wheel electrode 46 to the wire 22 during a welding process. The load cell 100 is positioned intermediate mounting structure 42 structure contact plate 57 and support assembly 40 support contact plate 59. Load cell 100 may comprise a commercially available precision compression loading type load cell. Specifically, load cell 100 measures forces applied to load cell 100 by structure contact plate 57 and support contact plate 59.

In an exemplary embodiment, load cell 100 is electronically connected to processor 9 of control panel 8 to provide continuous or intermittent communication of measured forces. Accordingly, motor 70 may be operated as a closed loop process wherein load cell 100 measured forces are processed. Processor 9 control commands responsive to measured forces are provided pursuant to predetermined parameters to motor 70, thereby inducing operation of motor 70 to move support assembly 40 in relation to mounting structure 42 to increase or decrease applied force.

Welding wheel electrode 46 is supported in a fixed vertical orientation on support assembly 40 during a welding process. Spindle 14, on which head 66 is positioned, is in a fixed vertical position in relation to mounting structure 42. Accordingly, head 66, together with ribs 20 and wire 22 supported thereon, is positioned in a fixed vertical position in relation to mounting structure 42. Accordingly, for any given welding process, welding wheel electrode 46 may be positioned on the faying surfaces of ribs 20 and wire 22. Upon calibration, the applied pressure of welding wheel electrode 46 to faying surfaces of ribs 20 and wire 22 may be determined. Applied pressure may then be adjusted by relative movement of support assembly 40 in relation to mounting structure 42.

Cylinders 50 dampen the movement of support assembly 40 in relation to mounting structure 42, thereby allowing controlled pressure application with self-correcting, dampening adjustments for variations, such as variations resulting from rotation eccentricities of the welding wheel electrode and spindle, welding wheel contact surface wear, and depth variations of faying surfaces.

Referring to FIG. 1, the weld pressure assembly 10 of the present invention includes a processor 9 in control module 8. Load readings from load cell 100 are transmitted to processor 9. Processor 9 is programmable to operate motor 70 and accordingly adjust position of support assembly 40 according to given conditions. Processor 9 is operable, continually or intermittently, to receive load data from load cell 100 and to adjust the vertical position of motor 70 to achieve a desired pressure level of welding wheel electrode 46 on wire 22. Such force level is indicated by load cell 100.

Operation

In operation, ribs 20 are extended through openings 26, and wire 22 is positioned on a rib 20. Each rib 20 and wire 22 comprise faying surfaces for welding by welding wheel electrode 46.

At the beginning of a welding process, welding wheel electrode 46 is positioned on wire 22. The indicated forces applied to load cell 100 are determined. Servo motor 70 is operated to provide a load of support assembly 40 in relation to structure 42, thereby providing a determined pressure of welding wheel electrode 46 on faying surfaces of wire 22 and ribs 20. As welding wheel electrode 46 is fixedly attached to support assembly 40, and wire 22 and rib 20 faying surfaces supported on spindle 14 are in a vertically fixed orientation in relation to mounting structure 42, the pressure applied by welding wheel electrode 46 to wire 22 and rib 20 is also determined.

Pressure applied within cylinders 50 is electronically controlled to maintain a determined cylinder pressure to offset the weight load of support assembly 40. As cylinder rods 58 are mounted on mounting structure 42, cylinders 50 can be adjusted to provide a determined load on load cell 100 as load cell 100 measures load applied intermediate contact plate 57 of mounting structure 42 and contact plate 59 of support assembly 40. Accordingly, by application of appropriate force by cylinders 50, the indicated load at load cell 100 between contact plates 57 and 59 can be set to zero (or other determined force).

With the determined initial position, processor 9 is operated to control motor 70 to operate lead screw 64 to vertically bias support assembly 40 in relation to mounting structure 42 until a determined application load force is obtained. The observed indicated load of load cell 100 indicates the pressure applied by welding wheel electrode 46 to the faying surfaces of wire 22 and ribs 20.

As spindle 14 of headstock 12 is rotated and welding wheel electrode 46 powered, the wire 22 is welded to successively rotated ribs 20. Rotation of spindle 14 results in wire 22 being drawn from spool 32 during welding operation. Processor 9 of control panel 8 is operated during a welding process to rotate spindles 14 and 30 concurrently and at like rotation speeds, to control lateral movement of tailstock 16, and to control pressure applied by welding pressure assembly 10 during the welding process.

Figure 4:
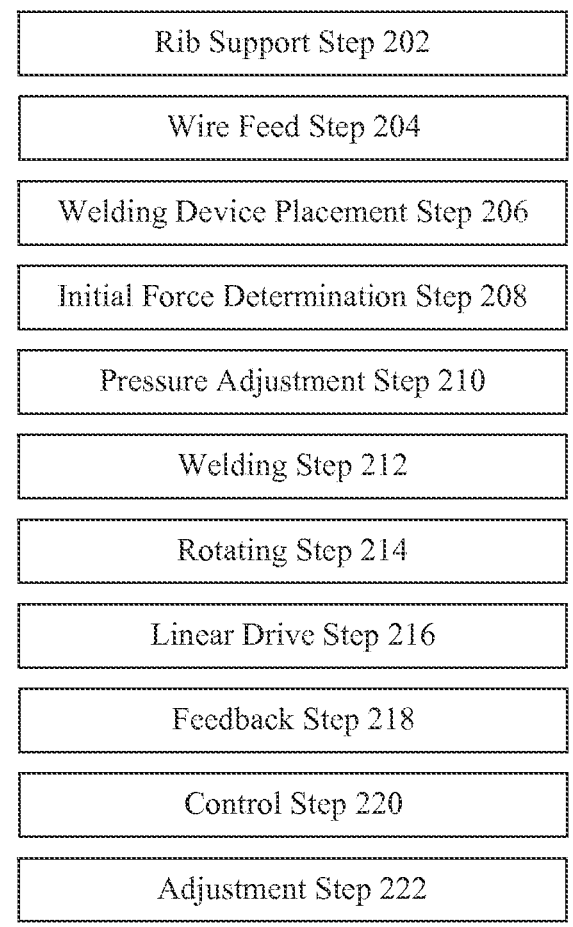
FIG. 4 depicts an embodiment of a method of the present invention.

Referring to FIG. 4, an exemplary method 200 of the present invention is disclosed for providing controlled welding pressure in a wire wrap screen manufacturing process, the method comprising the steps indicated herein.

A rib support step 202 comprises providing a support for ribs 20, said support comprising a rotating head 66.

A wire feed step 204 comprises providing wire 22 to an intersecting surface of a rib 20.

A welding device placement step 206 comprises providing a welding wheel electrode 46 supported on a support assembly 40 in contact with a wire 22 supported on a rib 20.

An initial force determination step 208 comprises determining pressure exerted on wire 22 by welding wheel electrode 46. Such determination is made by load cell 100 and indicates the load of support assembly 40 in relation to mounting structure 42. Such force is measured intermediate contact plate 57 and contact plate 59. Support assembly 40 is supported by a mounting structure 42.

A pressure adjustment step 210 comprises adjusting pressure of the welding wheel electrode 46 on wire 22 to a predetermined level. Pressure adjustment step 210 is accomplished by adjusting pressure within cylinders 50. Pressure adjustment may be further accomplished by servo motor 70 as part of a linear actuator system.

A welding step 212 comprises welding wire 22 to the rib 20 at the intersection of wire 22 and the rib 20.

A rotating step 214 comprises rotating spindle 14.

A linear drive step 216 comprises driving tailstock 16 along axis A-A away from headstock 12.

A feedback step 218 comprises continuous or intermittent measurement of indicated load intermediate contact plate 57 and contact plate 59.

A control step 220 comprises continuous or intermittent receipt of indicated load data, processing received data, and output of control commands according to predetermined parameters.

An adjustment step 222 comprises operation of the linear actuator system by servo motor 70 to move support assembly 40 in relation to mounting structure 42, thereby increasing or decreasing, as determined by operation parameters, pressure applied by welding wheel electrode 46 to wire 22 and ribs 20.

In an embodiment of the present invention, feedback step 218 involves measuring various data in relation to the system; including rotation speed of spindle 14, rotation speed of spindle 30, and linear travel of tailstock 16. In such embodiment, control step 220 includes receipt of indicated load data related to spindle 14 rotation speed, spindle 30 rotation speed, and linear travel of tailstock 16; processing the data; and output of control commands according to predetermined parameters. In such embodiment, adjustment step 222 comprises adjustment of spindle 14 rotation speed, spindle 30 rotation speed, and linear travel of tailstock 16.

While the preferred embodiments of the invention have been described and illustrated, modifications thereof can be made by one skilled in the art without departing from the teachings of the invention. Descriptions of embodiments are exemplary and not limiting. The extent and scope of the invention is set forth in the appended claims and is intended to extend to equivalents thereof. The claims are incorporated into the specification. Disclosure of existing patents, publications and known art are incorporated herein to the extent required to provide reference details and understanding of the disclosure herein set forth.

We claim:

1. A wire wrapping system comprising:
   a bed;
   a wire feed assembly adapted to provide wire to the wire wrapping system;
   a headstock disposed proximate a first end of the bed and comprising a rotating spindle that is adapted to allow for provision of a plurality of support ribs to the wire wrapping system;
   a tailstock comprising a rotating spindle, the tailstock moveable along the bed in a direction away from the headstock and toward a second end of the bed, and adapted to allow for attachment of one end of each said support rib to the tailstock; and
   a welding pressure control assembly comprising:
      a welding device;
      a welding support assembly and a mounting structure which are independently moveable;
      a force measurement device;
      a processor;
      one or more pressure-variable, fluid containing cylinders adapted to at least partially effectuate a desired weight load of the welding device on the wire; and
      a mechanism adapted to vertically position the welding support assembly in relation to the mounting structure, wherein:
      the welding device is fixedly attached to the welding support assembly;
      the force measurement device is disposed intermediate the welding support assembly and the mounting structure;
      the force measurement device is adapted to measure force transmitted to the welding device through the welding support assembly;
      the force measurement device is in informational communication with the processor;
      the processor is in informational communication with the mechanism;
      the processor is adapted to utilize a force information communicated by the force measurement device to control an operation of the mechanism;
      the mechanism comprises a motor adapted to vary a vertical position of the welding support assembly to at least partially effectuate the desired weight load of the welding device on the wire; and
      the processor is configured to control an operation of the motor during a welding process, based on the force information, by controlling the vertical position of the welding support assembly in relation to the mounting structure, and by adjusting a vertical position of the welding device to control a pressure applied by the welding device on the wire.

2. The apparatus of claim 1, wherein the welding device comprises a welding wheel electrode.

3. The apparatus of claim 1, wherein the motor comprises a servo motor.

4. The apparatus of claim 1, wherein the one or more pressure-variable, fluid containing cylinders are selected from the group consisting of: a pneumatic cylinder; a hydraulic cylinder; and combinations thereof.

5. The apparatus of claim 1, wherein the force measurement device comprises a load cell.

6. The apparatus of claim 1, wherein the motor is a component of a linear actuator system.

7. The apparatus of claim 6, wherein the linear actuator system comprises a ball screw.

8. A welding pressure control assembly comprising: a bed; a wire feed assembly adapted to provide wire to the wire wrapping system; a headstock disposed proximate a first end of the bed and comprising a rotating spindle that is adapted to allow for provision of a plurality of support ribs to the wire wrapping system; a tailstock comprising a rotating spindle, the tailstock moveable along the bed in a direction away from the headstock and toward a second end of the bed, and adapted to avow for attachment of one end of each said support rib to the tailstock; a welding wheel electrode; a welding support assembly and a mounting structure which are independently moveable; a load cell; a processor; one or more pressure-variable, fluid containing cylinders adapted to at least partially effectuate a desired weight load of the welding device on the wire; and a linear actuator system adapted to vertically position the welding support assembly in relation to the mounting structure to at least partially effectuate the desired weight load of the welding device on the wire, wherein: the welding wheel electrode is fixedly attached to the welding support assembly; the load cell is disposed intermediate the welding support assembly and the mounting structure; the load cell is adapted to measure force transmitted to the welding wheel electrode through the welding support assembly; the load cell is in informational communication with the processor; the processor is in informational communication with the linear actuator system; the processor is adapted to utilize a force information communicated by the load cell to control an operation of the linear actuator system; and
   the processor is configured to control the operation of the linear actuator system during a welding process, based on the force information, by controlling a vertical position of the welding support assembly in relation to the mounting structure, and by adjusting a vertical position of the welding device to control a pressure applied by the welding wheel electrode on the wire.

9. The apparatus of claim 8, wherein the linear actuator system comprises a servo motor.

10. The apparatus of claim 1, wherein the one or more pressure-variable, fluid containing cylinders are selected from the group consisting of: a pneumatic cylinder; a hydraulic cylinder; and combinations thereof.

11. The apparatus of claim 6, wherein the linear actuator system comprises a ball screw.

12. A method for providing controlled welding pressure in a wire wrap screen manufacturing process comprising: a rib support step comprising providing a support for a plurality of ribs, the support comprising a rotating spindle, wherein a proximate end of each rib is connected to a tail stock; a wire feed step comprising providing a wire to an intersecting surface of one of the ribs; a welding device placement step comprising providing a welding device in contact with the wire at the intersecting surface, wherein the welding device is supported on a support assembly; an initial force determination step comprising determining an initial pressure exerted on the wire by the welding device; a pressure adjustment step comprising adjusting a pressure exerted by the welding device on the wire to a predetermined level; a welding step comprising welding the wire to the rib at the intersecting surface; a rotating step comprising rotating the spindle; a linear drive step comprising driving the tailstock away from the support assembly; a feedback step comprising obtaining measurement information of the pressure exerted on the wire by the welding device; a control step comprising receiving the measurement information, processing the measurement information, and outputting control commands according to predetermined parameters; and an operational adjustment step comprising operation of a motor during a welding process, based on the control commands, by adjusting a vertical position of the support assembly in relation to the wire, thereby providing control of the pressure applied to the wire by the welding device.

13. The method of claim 12, wherein the rib support step further comprises providing a pipe, wherein the pipe is provided through an opening in the rotating spindle and an end of the pipe is connected to the tailstock.

14. The method of claim 12, wherein the welding device is a welding wheel electrode.

15. The method of claim 12, wherein determining the pressure exerted on the wire by the welding device comprises utilizing a load cell.

16. The method of claim 12, wherein adjusting the pressure exerted by the welding device on the wire to a predetermined level comprises utilizing one or more components selected from the group consisting of:

the motor;

one or more pressure-variable, fluid containing cylinders; and both the motor and one or more pressure-variable, fluid containing cylinders.

17. The method of claim 12, wherein welding comprises electrical resistance welding.

18. The method of claim 12, wherein the rotating step and the linear drive step are performed concurrently.

19. The method of claim 12, wherein receiving the measurement information comprises receiving the measurement information in a manner selected from the group consisting of:

continuously;

intermittently; and a combination of continuously and intermittently.

20. The apparatus of claim 1, wherein the one or more pressure-variable, fluid containing cylinders are selected from the group consisting of: a pneumatic cylinder; a hydraulic cylinder; and combinations thereof.

\* \* \* \* \*

UNITED STATES PATENT AND TRADEMARK OFFICE
CERTIFICATE OF CORRECTION

PATENT NO. : 9,757,813 B2
APPLICATION NO. : 14/510247
DATED : September 12, 2017
INVENTOR(S) : Steven Mark Everritt et al.

Page 1 of 1

It is certified that error appears in the above-identified patent and that said Letters Patent is hereby corrected as shown below:

In the Claims

Column 8, Line 9, that portion of Claim 8 reading "avow" should read --allow--.

Column 8, Line 49, that portion of Claim 12 reading "tail stock" should read --tailstock--.

Column 10, Line 16, that portion of Claim 20 reading "apparatus of claim 1" should read --method of claim 16--.

Signed and Sealed this
Seventeenth Day of October, 2017

Joseph Matal
*Performing the Functions and Duties of the
Under Secretary of Commerce for Intellectual Property and
Director of the United States Patent and Trademark Office*